United States Patent
Metzger

(10) Patent No.: US 12,071,851 B2
(45) Date of Patent: Aug. 27, 2024

(54) SYSTEM FOR EXTRACTING WATER FROM LUNAR REGOLITH AND ASSOCIATED METHOD

(71) Applicant: UNIVERSITY OF CENTRAL FLORIDA RESEARCH FOUNDATION, INC., Orlando, FL (US)

(72) Inventor: Philip Metzger, Orlando, FL (US)

(73) Assignee: UNIVERSITY OF CENTRAL FLORIDA RESEARCH FOUNDATION, INC., Orlando, FL (US)

(*) Notice: Subject to any disclaimer, the term of this patent is extended or adjusted under 35 U.S.C. 154(b) by 0 days.

(21) Appl. No.: 18/318,766

(22) Filed: May 17, 2023

(65) Prior Publication Data

US 2023/0287790 A1 Sep. 14, 2023

Related U.S. Application Data

(63) Continuation-in-part of application No. 18/307,044, filed on Apr. 26, 2023, now Pat. No. 11,891,896,
(Continued)

(51) Int. Cl.
*E21C 51/00* (2006.01)
*B03C 1/30* (2006.01)
(Continued)

(52) U.S. Cl.
CPC ................ *E21C 51/00* (2013.01); *B03C 1/30* (2013.01); *B03C 7/02* (2013.01); *B04C 9/00* (2013.01);
(Continued)

(58) Field of Classification Search
CPC .......... B03C 1/30; B03C 7/02; B03C 2201/20; E21C 51/00; B04C 9/00; B04C 2009/001; B64G 4/00
See application file for complete search history.

(56) References Cited

U.S. PATENT DOCUMENTS 4,948,477 A 8/1990 Gibson et al.
5,017,283 A 5/1991 Oder
(Continued)

FOREIGN PATENT DOCUMENTS

CN 107876754 A 4/2018

OTHER PUBLICATIONS

Agosto, "Lunar Beneficiation," Space Resources: Materials; NASA SP-509: vol. 3; pp. 153-161 (1992). (See Priority U.S. Appl. No. 17/177,277, filed Feb. 17, 2021).
(Continued)

*Primary Examiner* — Michael McCullough
*Assistant Examiner* — Kalyanavenkateshware Kumar
(74) *Attorney, Agent, or Firm* — ALLEN, DYER, DOPPELT + GILCHRIST, P.A.

(57) ABSTRACT

The system extracts water from lunar regolith and includes a regolith intake having a digging bucket that collects lunar regolith soil and a gravel separator that separates and discharges gravel and passes a mixture of ice-regolith powder having ice grains that are about 10-100 microns along the conveyor. A pneumatic separator receives the ice-regolith powder and pneumatically splits the ice-regolith powder
(Continued)

into streams of different sized lithic fragments and ice particles per the ratio of inertial force and aerodynamic drag force of the lithic fragments and ice particles. Each split stream may include a magnetic separator that separates further the magnetic and paramagnetic lithic fragments from ice particles to discharge up to 80 percent of lithic fragments to slag.

20 Claims, 7 Drawing Sheets

Related U.S. Application Data which is a continuation of application No. 17/177,277, filed on Feb. 17, 2021, now Pat. No. 11,719,100.

(60) Provisional application No. 62/988,940, filed on Mar. 13, 2020.

(51) Int. Cl.
  B03C 7/02      (2006.01)
  B04C 9/00      (2006.01)
  B64G 4/00      (2006.01)
  B64G 5/00      (2006.01)

(52) U.S. Cl.
  CPC .......... B64G 4/00 (2013.01); B64G 5/00 (2013.01); B03C 2201/20 (2013.01); B04C 2009/001 (2013.01)

(56) References Cited

U.S. PATENT DOCUMENTS

| | | | |
|---|---|---|---|
| 5,127,586 | A | 7/1992 | Oder |
| 5,176,260 | A | 1/1993 | Oder |
| 6,460,788 | B1 | 10/2002 | De Feraudy |
| 6,614,018 | B1 | 9/2003 | Schubert |
| 6,927,354 | B1 | 8/2005 | Brown et al. |
| 6,930,304 | B2 | 8/2005 | Schubert |
| 7,309,437 | B2 | 12/2007 | Cuero et al. |
| 9,027,265 | B1 | 5/2015 | Mueller et al. |
| 9,073,088 | B2 | 7/2015 | Walton et al. |
| 9,334,693 | B2 | 5/2016 | Walton et al. |
| 9,435,111 | B2 | 9/2016 | Cao et al. |
| 9,581,021 | B2 | 2/2017 | Ethridge |
| 10,162,065 | B2 | 12/2018 | Stassun et al. |
| 10,307,970 | B2 | 6/2019 | Snyder et al. |
| 2009/0071877 | A1 | 3/2009 | Taylor et al. |
| 2012/0132594 | A1 | 5/2012 | Baki et al. |
| 2012/0145051 | A1 | 6/2012 | Sweeney |
| 2014/0165461 | A1 | 6/2014 | Cao et al. |
| 2014/0209515 | A1 | 7/2014 | Walton et al. |
| 2014/0262278 | A1 | 9/2014 | Walton |
| 2015/0231826 | A1 | 8/2015 | Snyder et al. |
| 2016/0082478 | A1 | 3/2016 | Walton et al. |
| 2018/0178292 | A1 | 6/2018 | Berggren et al. |
| 2018/0194626 | A1 | 7/2018 | Berggren et al. |
| 2019/0248517 | A1 | 8/2019 | Hakamada et al. |
| 2019/0263699 | A1 | 8/2019 | Finger et al. |
| 2019/0271228 | A1 | 9/2019 | Sowers, Jr. et al. |
| 2019/0388906 | A1 | 12/2019 | Robbins et al. |
| 2020/0130871 | A1 | 4/2020 | Drexler |
| 2020/0240267 | A1 | 7/2020 | Sercel et al. |
| 2021/0404338 | A1 | 12/2021 | Metzger |

OTHER PUBLICATIONS

Austin et al., "Robotic Lunar Surface Operations 2," Acta Astronautica; 176 (2020); pp. 424-437. (See Priority U.S. Appl. No. 17/177,277, filed Feb. 17, 2021).

Captain et al., "Tribocharging Lunar Simulant in Vacuum for Electrostatic Beneficiation," AIP Conference Proceedings 880; Feb. 1, 2007; pp. 951-956. (See Priority U.S. Appl. No. 17/177,277, filed Feb. 17, 2021).

Elliott et al., "Operations Modeling of ISRU Lunar Base Architectures," NASA Poster; Developing a New Space Economy (2019); 2 pages. (See Priority U.S. Appl. No. 17/177,277, filed Feb. 17, 2021).

Kornuta et al., "Commercial Lunar Propellant Architecture: A Collaborative Study of Lunar Propellant Production," REACH—Reviews in Human Space Exploration; 13 (2019); 100026; pp. 1-77. (See Priority U.S. Appl. No. 17/177,277, filed Feb. 17, 2021).

Mueller et al., "A Review of Extra-Terrestrial Mining Robot Concepts," NASA Technical Reports Server; Aug. 30, 2019; Abstract only; 1 page. (See Priority U.S. Appl. No. 17/177,277, filed Feb. 17, 2021).

Mueller et al., "Regolith Advanced Surface Systems Operations Robot (RASSOR)," IEEE Aerospace Conference Proceedings; Mar. 2013; pp. 1-10. (See Priority U.S. Appl. No. 17/177,277, filed Feb. 17, 2021).

Nakhaei et al., "CFD Modeling of Gas-Solid Cyclone Separators at Ambient and Elevated Temperatures," Processes; 2019; 8, 228; pp. 1-26. (See Priority U.S. Appl. No. 17/177,277, filed Feb. 17, 2021).

Oder et al., "Magnetic Beneficiation of Lunar Soils," Proceedings of the Lunar Materials Technology Symposium; NASA-CR-192881; Third Annual Symposium of the University of Arizona/NASA Space Engineering Research Center; Feb. 1992; pp. III-15 through III-23. (See Priority U.S. Appl. No. 17/177,277, filed Feb. 17, 2021).

Quinn et al., "Evaluation of Tribocharged Electrostatic Beneficiation of Lunar Simulant in Lunar Gravity," Journal of Aerospace Engineering; Jan. 2013; 26(1); pp. 37-42. (See Priority U.S. Appl. No. 17/177,277, filed Feb. 17, 2021).

Rasera et al., "The Beneficiation of Lunar Regolith for Space Resource Utilisation: A Review," Planetary and Space Science; 186; (2020); 104879; pp. 1-15. (See Priority U.S. Appl. No. 17/177,277, filed Feb. 17, 2021).

Taylor et al., "Magnetic Beneficiation of Highlands Soils: Concentrations of Anorthite and Agglutinates," Abstracts of the Lunar and Planetary Science Conference; vol. 21; Mar. 1990; pp. 1243-1244. (See Priority U.S. Appl. No. 17/177,277, filed Feb. 17, 2021).

Trigwell et al., "Electrostatic Beneficiation of Lunar Regolith: Applications in In Situ Resource Utilization," Journal of Aerospace Engineering; Jan. 2013; 26(1); pp. 30-36. (See Priority U.S. Appl. No. 17/177,277, filed Feb. 17, 2021).

Trigwell et al., "Quantification of Efficiency of Beneficiation of Lunar Regolith," Particulate Science and Technology; Jan. 10, 2013; 31:1; pp. 45-50. (See Priority U.S. Appl. No. 17/177,277, filed Feb. 17, 2021).

Trigwell et al., "The Use of Tribocharging in the Electrostatic Beneficiation of Lunar Simulant," IEEE Transactions on Industry Applications; 45(3); Jul. 2009; pp. 1060-1067; Abstract (3 pages). (See Priority U.S. Appl. No. 17/177,277, filed Feb. 17, 2021).

Zacny et al., "PlanetVac: Pneumatic Regolith Sampling System," IEEE Aerospace Conference Proceedings; Mar. 2014; Downloaded from Internet on Feb. 9, 2021; pp. 1-7. (See Priority U.S. Appl. No. 17/177,277, filed Feb. 17, 2021).

Zacny et al., "Pneumatic Excavator and Regolith Transport System for Lunar ISRU and Construction," American Institute of Aeronautics and Astronautics Conference & Exposition; Sep. 2008; pp. 1-23. (See Priority U.S. Appl. No. 17/177,277, filed Feb. 17, 2021).

SYSTEM FOR EXTRACTING WATER FROM LUNAR REGOLITH AND ASSOCIATED METHOD

RELATED APPLICATION (S)

This is a continuation-in-part application based upon U.S. patent application Ser. No. 18/307,044 filed Apr. 26, 2023, which is a continuation application based upon U.S. patent application Ser. No. 17/177,277 filed Feb. 17, 2021, which is based upon U.S. patent application Ser. No. 62/988,940 filed Mar. 13, 2020, the disclosures which are hereby incorporated by reference in their entirety.

FIELD OF THE INVENTION

This invention relates to extractors, and more particularly, to a system for extracting water from lunar regolith and related methods.

BACKGROUND OF THE INVENTION

Volatiles by definition flee energy, which makes them a rare commodity in the inner solar system and outside the gravitational pull of Earth that keeps them trapped. On the Moon, the volatiles are sequestered in lunar regolith where they are protected from sunlight, with the best deposits in permanently shadowed regions (PSRs). Mining the volatiles such as water and converting them into chemical rocket propellant requires large quantities of energy, because rocket fuel is by definition stored energy. An issue to be addressed in lunar propellant manufacture, and especially with extracting water from lunar regolith, is therefore how to bring the energy and the volatiles together.

It is possible to transport energy into the permanently shadowed regions, often down steep slopes for many kilometers in darkness and extreme cold. It is also possible to transport the great mass of mined materials out of those craters along the same route going uphill. Transporting energy can be done by beaming sunlight from large mirrors positioned on the crater rims, by locating large nuclear reactors inside the craters, or other methods. Transporting mined materials can be done by throwing it ballistically out of the craters, by driving it out on lunar rovers, or by other techniques. Driving with heavy loads is difficult because of the risk of getting stuck in the regolith. In any event, the lunar water ice is about 5 weight percent of the regolith or less depending on location, and for that reason, 95% of the hauling effort is wasted and unnecessarily risky. This is especially relevant in extracting water from lunar regolith where improved techniques and systems may be applied for lunar ice extraction.

SUMMARY OF THE INVENTION

In general, a system for extracting water from lunar regolith may include a regolith intake having a digging bucket that collects lunar regolith and includes a gravel separator that separates and discharges gravel and passes a mixture of ice-regolith powder having ice grains that are about 10-100 microns. A pneumatic separator may receive the ice-regolith powder and pneumatically split the ice-regolith powder into split streams of different sized lithic fragments and ice particles per the ratio of inertial force and aerodynamic drag force of the lithic fragments and ice particles. Each split stream may have a magnetic separator to separate further magnetic and paramagnetic lithic fragments from ice particles and discharge up to 80 percent of lithic fragments to slag. In an example, a spiral separator may receive a mixture of ice-regolith powder. The pneumatic separator may be formed as a cyclone separator.

In an example, the digging bucket may include a front section that may comprise a plurality of spaced bars to keep rocks from entering the digging bucket. A pivot support may mount at least every other bar, allowing a bar to raise upward and release jammed rocks. Each pivot support may include a drive mechanism configured to raise upward a bar. A sensor may be connected to each drive mechanism and be configured to sense a jammed rock and transmit a signal to the associated drive mechanism to raise the bar and release the jammed rock. A conveyor of the regolith intake may be formed as a closed tube having orifices through which the ice-regolith powder passes.

At least one of the magnetic separators may include a first magnetic coil configured to separate strong magnetic particles using a magnetic field of about 400 to 600 gauss, and a second magnetic coil configured to separate paramagnetic particles at a higher intensity magnetic field of about 6,000 to 20,000 gauss. The regolith intake may include a powder receiver adjacent the conveyor and connected to the pneumatic separator that receives the ice-regolith powder from the conveyor. The powder receiver may be configured to fluidize the ice-regolith powder and move it to the pneumatic separator. The pneumatic separator may split the ice-regolith powder into three split streams of different sized lithic fragments and ice particles, with splits at about 30 microns and 693 microns for the lithic fragments corresponding to about 90 microns and 2.08 millimeters for the ice particles. A lunar rover body may carry the regolith intake, pneumatic separator and magnetic separators or the pneumatic separator and magnetic separators may be stand-alone units.

The system may include a tribocharger/electrostatic separator connected to each magnetic separator and configured to produce about 100 to 10,000 times the acceleration of ice particles versus lithic fragments of the same diameter size, allowing almost 100 percent of ice particle separation in the mid diameter range. The tribocharger/electrostatic separators may be configured for concentrating water and ilmenite.

A method is disclosed and includes extracting water from lunar regolith. The method may include collecting lunar regolith in a digging bucket of a regolith intake and operating a gravel separator to move the lunar regolith and separating and discharging gravel and passing a mixture of ice-regolith powder having ice grains that are about 10-100 microns. The method may include receiving the ice-regolith powder into a pneumatic separator and splitting the ice-regolith powder into split streams of different sized lithic fragments and ice particles per the ratio of inertial force and aerodynamic drag force of the lithic fragments and ice particles. The method includes separating magnetic and paramagnetic lithic fragments from ice particles within a magnetic separator that is positioned within each split stream, and discharging up to 80 percent of lithic fragments to slag.

DESCRIPTION OF THE DRAWINGS

Other objects, features and advantages of the present invention will become apparent from the detailed description of the invention, which follows when considered in light of the accompanying drawings in which.

DETAILED DESCRIPTION

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
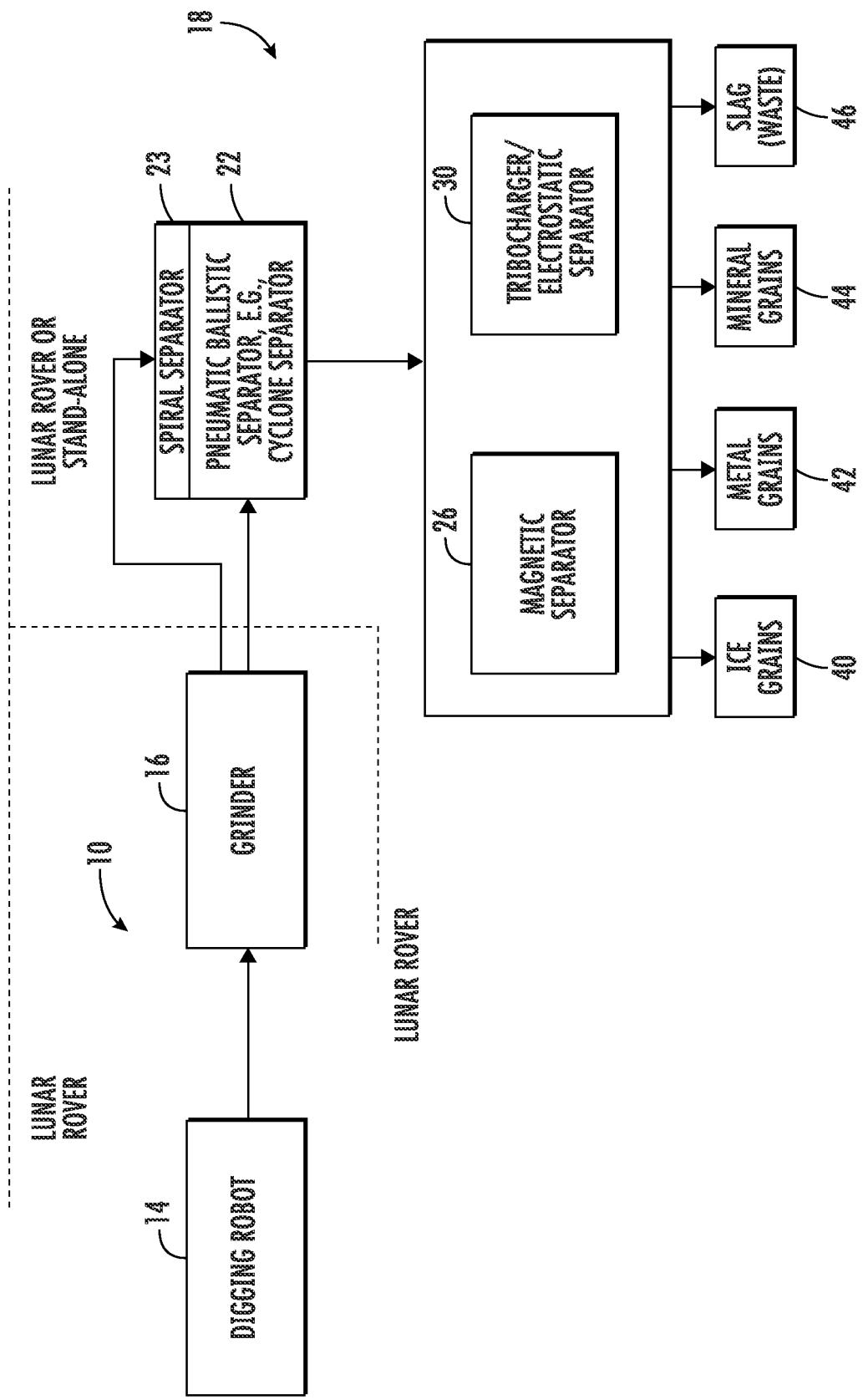
FIG. 1 is a high level block diagram of a system for extracting water from lunar regolith in accordance with a non-limiting example.

The system as illustrated generally at 10 in FIG. 1 may be used for lunar extraction of ice and water from Moon regolith and brings the energy and volatiles together in an efficient manner. As a byproduct, the system 10 may produce hundreds of tons of free metal and other beneficiated resources at the same time for almost no energy cost. Because the Moon lacks an atmosphere, it is continuously pummeled by primarily chondritic dust falling to the surface at or exceeding lunar escape velocity. As a result of billions of years of this process, the lunar soil has three specific advantages over the Earth for mining. First, the rocks are already broken finely so that the most expensive part of mining on Earth, i.e., breaking rocks, is already complete.

Second, the ice that was deposited and trapped hundreds of millions to billions of years ago in the lunar cold regolith is frozen as hard as granite. It acts similar to another mineral, and therefore, it has also been broken into fine grains similar to other rocks and minerals in the soil.

Third, about one weight percent of the soil is converted by the high temperature and pressure of the impacts into free metal particles. Thus, the high energy aspects of mining can be avoided. The system 10 may sort the different grains from each other and transport the volatiles, and possibly the free metal out of the permanently shaded regions, and then process them in the abundant sunlight. To perform this, the system 10 operates as a combination of density separation, magnetic separation, and electrostatic separation that operates with low power and low mass of equipment in a permanently shaded region of the Moon and may operate as a water extraction and propellant manufacturing technique. Thermal extraction by other techniques may be a waste of energy that needlessly complicates a lunar mining architecture and requires excessively large power generation and distribution systems. Hauling tons of dead mass, the 95% or more of the regolith that is not a resource, is also a pointless and risky exercise that should not be performed.

The system 10 may include a low-energy digging robot 14, similar to any of the approximately 470 robots that have been prototyped and successfully tested during ten years of NASA's Robotic Mining Competition. The digging robot 14 scoops the lunar regolith. This digging robot 14 transfers the regolith into a grinder 16 and into a conveyor, such as an auger or a pneumatic conveyor, which brings it into the beneficiating mechanisms illustrated generally at 18. The soil may be passed through a series of stages including light grinding or crushing as part of the grinder 16, followed in this example by pneumatic ballistic sorting 22, magnetic separation 26, and tribocharger/electrostatic separation 30, potentially in multiple stages of each type using different field strengths to sort the particles further each time. The pneumatic separator 22 may be formed as a cyclone separator and the beneficiating system 18 may include spiral separator 23.

The system 10 may output separated streams of ice grains 40, metal grains 42, and possibly specific mineral grains 44 of high resource value (e.g., ilmenite or anorthite), plus the stream of unwanted grains, or slag 46. The slag 46 is dropped adjacent to the mining zone while the desired resources can be transported to sunlight for the higher energy stages of processing. Because the vast majority of the regolith's mass has been removed, transporting it into the sunlight for processing is no longer a risky endeavor. The magnetic separator 26 and tribocharger/electrostatic separator 30 may be placed in parallel or one before the other and vice versa to produce the separate streams of ice grains 40, metal grains 42, mineral grains 44, and slag 46 that is later discharged. In an example, the magnetic separator 26 is placed before any tribocharger/electrostatic separator 30.

The pneumatic ballistic separator 22 may include mechanical sorters that include different sets of paddles that may be 60 to 100° out-of-phase from an adjacent paddle to provide agitation of the material stream on top of a deck. In an example, the system 10 may include a rotor that has impellers that fling material in the air and separate a lighter, regolith powder section from a heavier regolith powder section. The grinder 16 may include different grinding wheels or blades that receive and grind regolith into a ground regolith powder. The magnetic separator 26 may also include an eddy current separator device and a rare earth magnetic separator device. The tribocharger/electrostatic separator 30 may be formed from different tribocharging devices, including a tribocyclone device, a fluidized bed device, a static charger device, and rotating tube device, and a propeller-type device.

It should be understood that when a granular mixture such as the lunar regolith powder is shaken, the triboelectric effect may cause charges to accumulate on particular minerals. Sometimes a negative charge may accumulate on smaller grains. The existing charge on lunar grains may reduce the effectiveness of some separation devices, but will be advantageous in the tribocharger/electrostatic separator 30.

The system 10 may include cleanup of any water to remove unwanted volatiles and other contaminants using differential sublimation, differential permeation, or other techniques, followed by electrolysis to split the water into hydrogen and oxygen, which may be chilled and transferred into cryogenic tanks on, for example, a lunar shuttle/space tug for use as rocket propellant. While the mining or digging robot 14 is in the sunlight, it may recharge its batteries or refill its fuel cells and then return to mining in the permanently shaded region. There are locations in the Moon's poles where driving distances from sunlight to the ice resource are a few kilometers on gentle slopes, and that is not unreasonable with the reduced loads after resource extraction. Ice concentrations in these "Type 2" locations are expected to be about 18. This system 10 of mining uses such little energy that it does not require any special energy systems beyond the batteries or fuel cells located on a robot 14 to go in and out of the permanently shaded region.

Design variations may be added to extend the system 10 reach into the deeper permanently shaded regions where ice has higher concentrations, up to 5% as found in some LCROSS results. The higher concentration of ice may offset the cost of additional infrastructure in the long term. For example, additional fuel cells may increase driving distance, or by adding solar energy towers, mining and processing may be done entirely inside permanently shaded regions at reduced energy with no driving sunlight requirement.

The system 10 uses the beneficiation subsystem 18, instead of thermal extraction. A beneficiation subsystem 18 may require low energy and reduced power infrastructure than other proposed techniques, resulting in much lower start-up cost. It is feasible for the system 10 to be set up on just one lunar landing.

It is possible to measure electrostatic charging of the ice and quantify key parameters in the function of ice separation by electrostatics using the tribocharger/electrostatic separator 30. Vacuum chamber tests, reduced gravity flight tests, and analog field demonstrations may be performed in a test setting. Equipment for further particle separation may be inherently scalable to small size with a low safety risk to personnel. The system 10 requires low power and can be validated for realistic performance in modest vacuum chambers and in reduced gravity flights, and can be built into inexpensive robotic prototypes for full-scale tests. It is possible that small-scale experiments may be flown to the lunar surface on a Commercial Lunar Payload Services (CLPS) mission to demonstrate the technology in situ.

It is possible for spacecraft to fly directly from the lunar surface with a load of propellant to geostationary transfer orbit to boost a communications satellite, and may then return to the lunar surface for more propellant, eliminating the need for costly propellant depots. A single company can therefore operate a space tug and a mining rover plus a purification and electrolysis plant as three major assets. It is possible that propellant depots may be online.

Beneficiation has been used in terrestrial mining as an intermediate step between extraction and chemical processing, while magnetic or density approaches have been used to concentrate resources. The system 10 applies different processing techniques to separate ice and metal from lunar regolith. Combinations of these methods concentrate useful silicate minerals, but some of these techniques have not been used to extract water and ice.

Gas flow enclosed in pipes may lift and accelerate individual particles and separate them ballistically or centrifugally. This process uses the same principle as winnowing: separation of particles is determined by the ratio of inertial force and aerodynamic drag force, which is called the ballistic coefficient. Inertial force scales as density $\rho$ times diameter cubed, $\rho d^3$. Aerodynamic drag force at low gas velocities scales as particle surface area, or $d^2$. Thus, the ballistic coefficient scales as $\rho d$. Since $\rho_{Rock} \approx 3\rho_{ice}$, the pneumatic separator 22 may tend to separate silicate mineral particles of d into the same bin as ice particles of 3d. As a result, only partial separation of ice comes from silicates, but these particles may be contained in bins according to specific size ranges.

Electrostatic beneficiation such as using a tribocharger/electrostatic separator 30 may be beneficial at concentrating water and ilmenite for oxygen production from among the other silicate minerals, including plagioclase and pyroxene.

A mixed mineralogy lunar regolith may be passed through a baffle to rub the soil grains across selected materials, causing the various minerals to electrically tribocharge based on their surface chemistry. This process may also be used to separate ice from the regolith because ice is known to tribocharge in cumulonimbus cloud updrafts and in volcanic plumes, thus concentrating electrical charge to cause lighting. The properties of ice and silicate grains, such as in lunar regolith, may be so different that electrostatic separation may be highly efficient and may be measured in the laboratory.

A constant mass of olivine as a common lunar mineral may be tribocharged against aluminum with the power law $C \sim \alpha_1 d^{-1.16}$, where C is the developed electrostatic charge, d is average particle size of the sample, and the coefficient is $\alpha_1 \sim -10^{-11}$ for a 1 mm particle using metric units. Since the number of particles N in each sample scales as $d^{-3}$, the charge per particle scales as $C/N \sim \alpha_1 d^{+1.84}$ and the ratio of inertial to electrostatic forces per particle scales as $\sim (\rho/\alpha) d^{+1.16}$. Similarly Anorthite's ratio of forces scales as $\sim (\rho/\alpha_2) d^{+1.21}$ and Ilmenite as $\sim (\rho/\alpha_3) d^{+1.71}$, where $\alpha_1 \approx -\alpha_2 \approx -100\alpha_3$. The factor 100 enables separation of ilmenite from the other two, whereas the opposite polarity on olivine enables separation of olivine from the other two, e.g., two examples among the lunar minerals. These values are for tribocharging using a tribocharger/electrostatic separator 30 against aluminum, and the values would be different if a different tribocharging material like phenolic were used.

The value of $\alpha$ for ice charging against aluminum is about $+5 \times 10^{-9}$ for ice grains other than dendritic or needle-shaped crystals. The fragile dendritic and needle shapes are unlikely to survive over billions of years in lunar regolith subjected to the constant meteoroid bombardment annealing or breaking linear structures. Assuming a particle size dependence $C \sim \alpha_{ICE} d^{-1.5}$ similar to the other crystalline granular materials, which may be tested to obtain more accurate values, the ratio of inertial to electrostatic forces may be $\sim (\rho/\alpha_{ICE}) d^{+1.5}$ with $(\rho/\alpha_{ICE})$ two to four orders of magnitude smaller for ice than $(\rho/\alpha_2)$ or $(\rho/\alpha_3)$ for the silicate grains.

The tribocharger/electrostatic separator 30 may separate regolith particles with size d into streams or bins as ice particles with size 100 d to 10,000 d. Each bin or stream that was initially separated by the pneumatic separator 22 may contain ice particles of roughly a factor of 3 (three) different in size than the silicate particles. Therefore, no particles in that same stream or bin may be a factor 100 to 10,000 different. The ice and silicate particles may be separated from each other by the secondary use of the tribocharger/electrostatic separator 30 using electrostatics following pneumatic separator 22. Practical beneficiation by the system 10 may not achieve complete separation, but these calculations may indicate significant concentration of ice is possible with the ideal of nearly complete separation as a real goal.

Use of the magnetic separator 26 may be performed before use of a tribocharger/electrostatic separator 30 and the magnetic separation may be challenging because paramagnetic susceptibility of minerals may be dominated by the superparamagnetic response of nanophase iron (NpFe) contained in the glass coating of the finest particles of lunar regolith. Therefore, magnets may tend to pull the fine particles out regardless of their composition. However, lunar ice should be sufficiently different than lunar regolith particles to enable ice separation on magnetic properties. Also, separation of free lunar metal particles has been accomplished with a magnet on actual lunar soil, but has not yet been developed into a high throughput process. The system 10 may use magnetic separators 26 in lieu of or in addition to electrostatic beneficiation to produce better separation at a lower power. The system 10 may use all three separation techniques to identify optimum process and study separation of ice, metal, and valuable minerals in the same process, depending on the maturity of the lunar soil. It may also use a spiral separator as explained below.

In highly mature lunar soil, the desirable minerals such as diamagnetic anorthite for making aluminum and paramagnetic ilmenite for extracting oxygen or making titanium have lost their pristine magnetic character by incorporation into glass agglutinate particles. It may be difficult to beneficiate by magnetism alone. Mature soils may possess more nanophase iron on the coatings of finer grains, which dominates the magnetic response. The maturity of the soil may affect the ability to obtain these additional resources while extracting the lunar ice.

Magnetic separation of the finest dust from other particles is possible because it is the fraction with maximized concentration of NpFe, so this dust can be provided to other processes that use microwave techniques. Dust may be mixed into quantities of raw lunar regolith to enhance microwave susceptibility and reduce energy when handling mature soils. After magnetic removal of the fines, light grinding of the remaining coarse soil and single-pass electrostatic beneficiation using the tribocharger/electrostatic separator 30 may produce 50-60% concentration Ilmenite, or a multiple-pass system may achieve 90% concentration. The system may obtain water ice and ilmenite, anorthite, and free metal as secondary benefits integrated into the ice-extraction system with little additional complexity.

Light grinding and/or grizzlies as rock barriers are used on the front end to comminute and/or remove rocks. Grinding may also help liberate ilmenite, anorthite, and metal grains from lithic fragments. It may also liberate ice crystals from lithic fragments if they are bound. However, because grinding generates heat, the system may use existing data from drilling and grinding tests to analyze how much grinding may occur in the permanently shaded regions before the heat causes loss of volatiles. Grizzlies or other particle sieving may be used on the front end.

In an example, 800 kW thermal energy may be required to extract 2,450 tons of water yearly to support a future commercial demand for lunar water, in addition to the energy required to set up the vapor capture tents, periodically move the tents, and haul the mined volatiles back and forth to a chemical processor. The volatiles may be refrozen for hauling and then may be melted (phase changed a second time) at a chemical processor.

The system 10 in this example skips the first vaporization step and the heating of rocky material to refreeze it again. The benefits come out in the system 10 by eliminating hardware that transports great amounts of energy. Beneficiating soil by the beneficiation subsystem 18 may not require an order of magnitude more energy than excavating it and pouring it through a separator. Producing 2,450 tons of water yearly at 5% concentration may require processing 49,000 tons of lunar regolith yearly, which equates to about 40 watts of power. This is a 98.3% reduction of mining power in the permanently shaded region. The energetic chemical cleanup and electrolysis processing may take place in the sunlight, where there is abundant energy. It is possible that 490 tons of metal per year may be made available for lunar construction and manufacturing, and possibly extracting ilmenite or anorthite as additional benefits.

It is possible for the system 10 to fit onto a single lunar rover as explained in further detail below with a bucket drum or low-energy scoop. The system 10 may optimize the process to sort (a) water ice grains 40, (b) free metal grains 42, and (c) an optional stream of ilmenite and/or anorthite grains 44 for oxygen and/or aluminum production. It may be possible to quantify the mass, energy, operations plan, and production rate.

Figure 2:
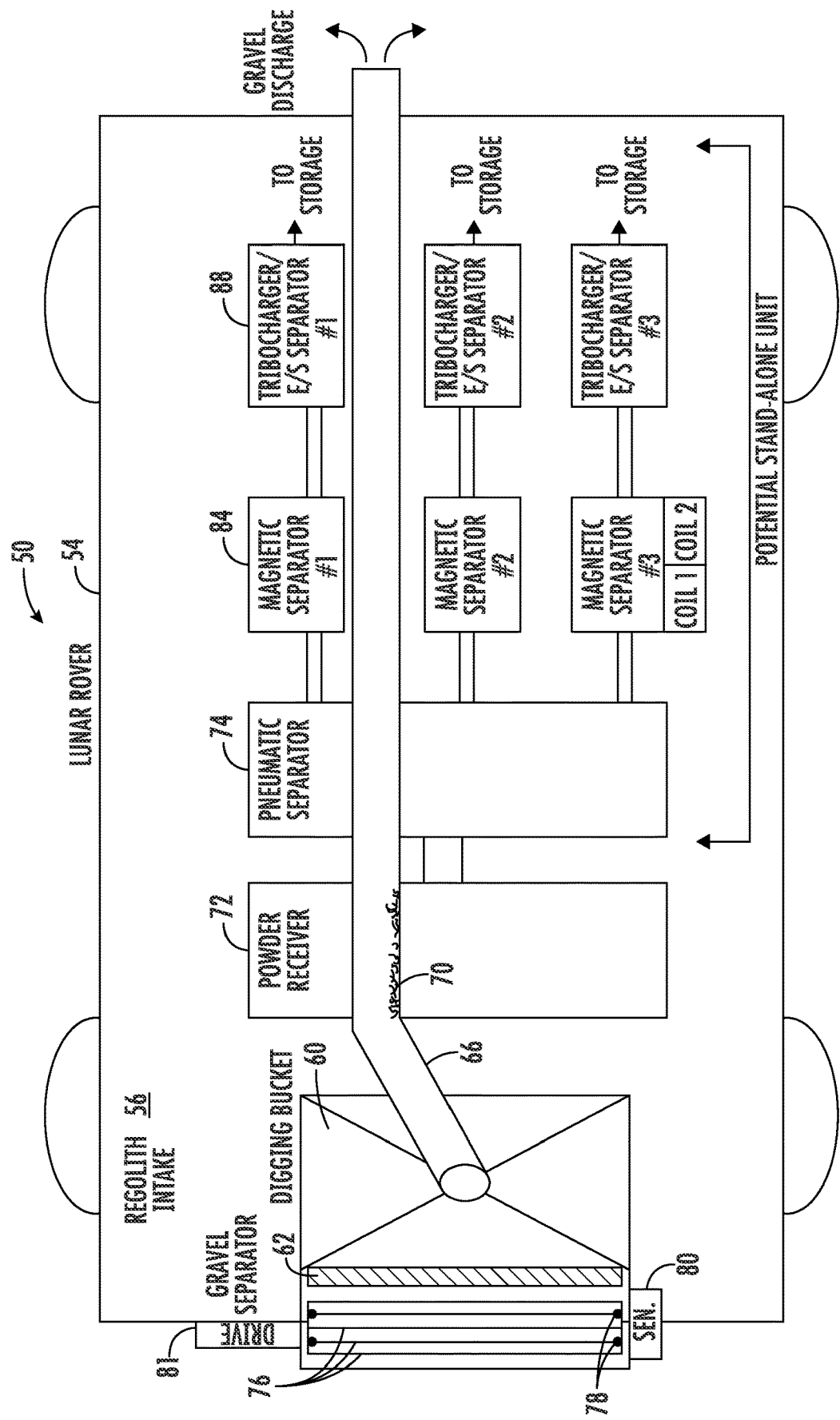
FIG. 2 is a block diagram of a lunar rover showing the different separators used in the example system of FIG. 1.

Another embodiment of the system for extracting water from lunar regular is shown at 50 in FIG. 2, and includes in schematic block format a lunar rover 54. A regolith intake 56 is mounted on the front section of the lunar rover 54 and includes a digging bucket 60 that collects lunar regolith and includes a gravel separator 62, which could be an auger and a conveyor 66 that receives the lunar regolith from the gravel separator and separates and discharges gravel at the rear portion of the lunar rover 54. The conveyor 66 has orifices 70 that pass a mixture of ice-regolith powder having ice grains that are about 10 to about 100 microns into a powder receiver 72 that is adjacent to the conveyor 66 and connected to the pneumatic separator 74.

The digging bucket 60 includes the front section that includes a plurality of spaced bars 76 to keep rocks from entering the digging bucket 60. A pivot support 78 mounts at least every other bar 76 allowing the bar mounted thereon to raise upward and release jammed rocks away from the digging bucket 60. Each pivot support 78 includes a sensor 80 that is configured to sense a jammed rock and transmit a signal to an associated drive mechanism to raise the bar 76 and release the jammed rock away from the digging bucket. The drive mechanism 81 can be integral with the pivot support 78 or separate. In an example, the conveyor 66 at the regolith intake 56 is formed as a closed tube having the orifices 70 through which the ice-regolith powder passes.

In an example, the powder receiver 72 adjacent the conveyor 66 is connected to the pneumatic separator 74 and receives the ice-regolith powder from the conveyor. The powder receiver 72 is configured to fluidize the ice-regolith powder and move it to the pneumatic separator 74. The pneumatic separator 74 receives the ice-regolith powder and pneumatically splits the ice-regolith powder into split streams of different sized lithic fragments and ice particles per the ratio of inertial force and aerodynamic drag force of the lithic fragments and ice particles. In an example, the ice-regolith powder is separated into three split streams of different sized lithic fragments and ice particles and in an example based upon splits of about 20 to 40 microns and 600 to 800 microns for lithic fragments with corresponding ranges of ice particles. In yet another example, the ice-regolith powder is split into three split streams of different sized lithic fragments and ice particles, with splits at about 30 and 693 microns for the lithic fragments corresponding to about 90 micron and 2.08 millimeters for the ice particles.

As illustrated, each split stream includes a magnetic separator 84 and with three split streams having three different magnetic separators. The magnetic separators 84 separate further the magnetic lithic fragments from ice particles and discharge up to 80% of lithic fragments to slag. In an example, at least one of the magnetic separators 84 may include a first magnetic coil configured to separate strong magnetic particles using a magnetic field of about 400 to 600 gauss, and a second magnetic coil configured to separate paramagnetic particles at a higher intensity magnetic field of about 6,000 to 20,000 gauss. It is possible to use permanent magnets, which require much lower power.

Each of the three split streams includes a magnetic separator 84 and includes a tribocharger/electrostatic separator 88 connected to each magnetic separator 84 and configured to produce about 100 to 10,000 times the acceleration of ice particles versus lithic fragments of the same diameter size, allowing almost 100% of ice particle separation in the mid-diameter range corresponding to the second stream from the pneumatic separator. The tribocharger/electrostatic separators 88 may be configured for concentrating water and ilmenite.

The system 50 in this example extracts ice from lunar regolith with ultra-low energy and minimal infrastructure. The system 50 may operate on a single CLPS lander as a lunar rover 54 without thermal extraction, which reduces energy demand in the Permanently Shadowed Regions (PSRs) by greater than 99%. The beneficiating system, however, may be on a stand-alone unit.

The system 50 is capable of supporting NASA's Sustainable Exploration concept and the Artemis program, and initially the system 50 may be a smaller size, but incrementally scale-up to large size as the risks are progressively bought down.

The pneumatic separator identified by reference numeral 22 in FIGS. 1 and 74 in FIG. 2 may be formed as a cyclone separator that includes a series of cyclones of decreasing diameter. Each sized cyclone may separate out all particles above a certain ballistic coefficient, while the finer or lighter particles may continue with the gas flow and exit the top. This exited gas may go into the next smaller cyclone, which separates the next smaller/lighter particles. This may be performed with a series of as many cyclones, but the system may separate the flow into three streams as shown with pneumatic separator in FIG. 2 or could be four or more streams. An example is a conical reverse-flow cyclone separator that may include a double vortex inside the cyclone. Smaller particles follow the gas out the top, which can be fed into the next smaller cyclone. Multiple stages may create separate particle streams.

Other techniques may be used for pneumatic size separation. It is possible to blow particles with gas up a pipe. The coarser particles do not go as fast as they fall down a side-pipe after only a short distance. The next smaller sized particles go faster so they travel uphill farther and fall down the next side-pipe. The next finer particle sizes go even faster and farther uphill and fall down the next side-pipe. Other techniques may be used. Some techniques are insensitive to inertial motions of the rover and the cyclone method may be more robust for that purpose.

It should also be understood that a spiral separator may be used, which is also termed a spiral chute. Traditional sieving screens may not work as well in low gravity because the soil does not flow through the small holes. A spiral separator, however, may separate solid components based on a solid particle density and a particle's hydrodynamic properties such as drag. Other techniques may be used.

It should be understood that the system may include a water cleanup system that may be partially into the permanently shadowed region and connected to a sunlit area by using a superconducting cable that is several kilometers long, e.g., 2 to 10 kilometers or more. Superconductive cables have been recently analyzed for use on the Moon by Dr. Paul van Susante's research group at Michigan Tech. The benefit of using a superconducting cable is that it is possible to place the water cleanup closer to the mining operation, and that way even more of the slag may be separated from the ice. In case the beneficiation only achieves 90% reduction of slag, then the water cleanup and finishing may reach 100% reduction of slag. As a result, hauling the resource the final 2 to 10 kilometers or more may result in the lowest possible mass.

Excavation with beneficiation with the system 50 as described and contained on one lunar rover 54 or separate stand-alone units has been found by modeling to be better than thermal extraction because it relies on the processing that nature already provided to the Moon's permanently shadowed regions. As noted above, billions of years of (micro-) meteoroid bombardment has already finely broken the crystalline solids. The ice that was deposited hundreds of millions to billions of years ago in the lunar regolith is frozen as hard as granite, and is yet another mineral and therefore, it has also been broken into fine grains similar to other rocks and minerals in the soil. The grains are about 10-100 microns in size based on M3 Near Infrared (NIR) reflectance spectra, indicating ~70 µm ice grains on the surface vapor deposition, and based on NIR (Near Infrared) spectral band width and position of LCROSS ejecta, indicating the ice from depth were crystallized particles to about 8 µm mean size. The system 50 sorts the different crystalline phases from each other without phase change. For that reason, the system 50 may transport the volatiles out of the permanently shadowed regions to process in the sunlight where energy is available, avoiding most of the infrastructure and cost associated with other proposals. The system 50 advantageously may use a pneumatic separator 74, magnetic separators 84, and tribocharger/electrostatic separators 88, all of which operate with low power and low equipment mass in a permanently shadowed region.

Figure 3:
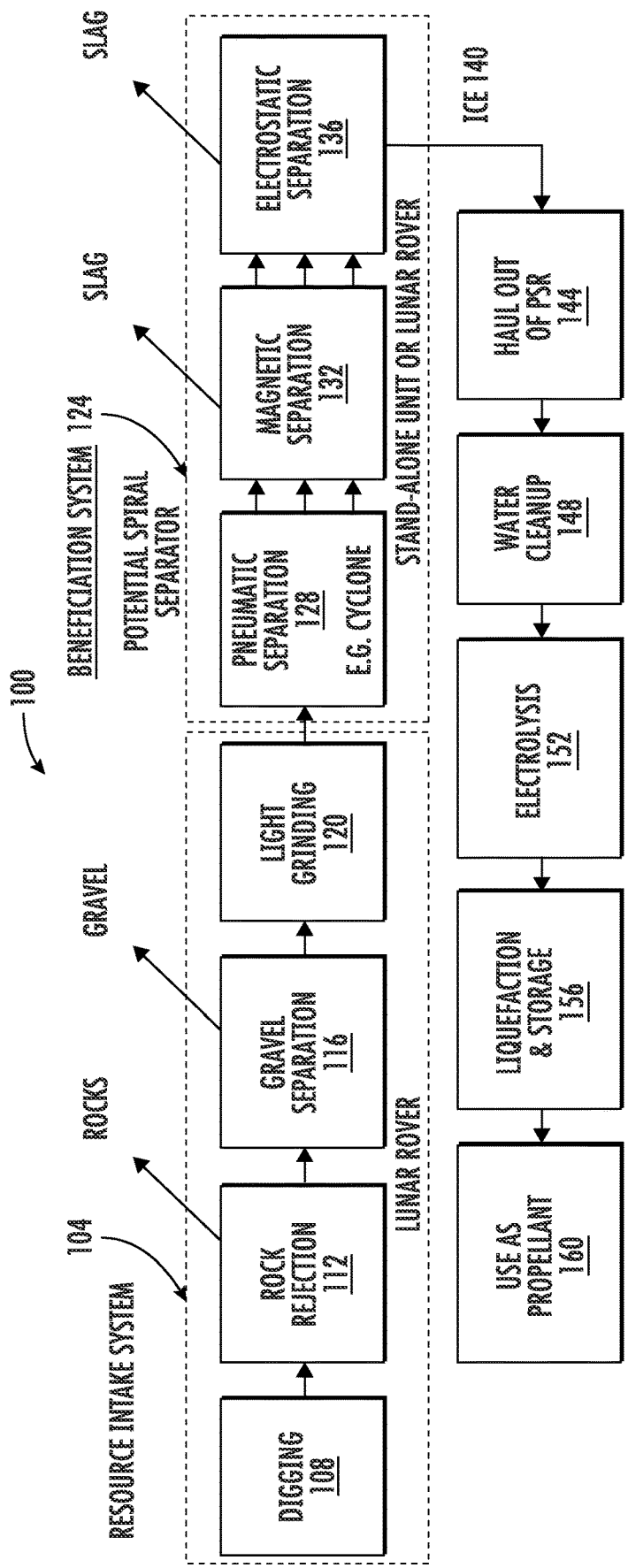
FIG. 3 is a more detailed process flow of the systems of FIGS. 1 and 2.

Referring now to FIG. 3, there is illustrated another flow sequence for an example system illustrated generally at 100, which includes a resource intake system 104 having a digging section 108 followed by rock rejection 112 and gravel separation 116 and light grinding 120. The beneficiation subsystem 124 includes pneumatic separation 128 followed by magnetic separation 132 in which the slag is separated. This is then followed by an electrostatic separation 136 as an example tribocharger/electrostatic separation in which further slag is expelled. The ice 140 is then taken out and hauled out of the permanently shadowed region 144 of the Moon. Water clean-up 148 occurs followed by electrolysis 152 and then liquefaction and storage 156 and then use as the propellant 160.

The process 100 shown by FIG. 3 may include a robot for digging 108 that scoops the lunar regolith with rock-rejection 112 and gravel separation 116 to pass only fines. A grinder 120 fractures the weaker particles, liberating ice fragments from mineral and lithic fragments. This resource intake system 104 transfers the lunar regolith into the batch processing beneficiation system 124, with pneumatic separation 128, magnetic separation 132, and tribocharger/electrostatic separation 136. The system 100 outputs separated streams of ice grains and slag soil particles. The beneficiation 124 allows the system 100 to simultaneously separate free metal particles and specific mineral grains of high resource value. The soil is 95-98% weight non-ice ("slag"), which is dropped adjacent to the mining zone while the desired 2-5% weight of ice is transported to sunlight, made feasible by the extreme mass reduction.

With this system 100, it is possible to ensure that a pilot plant may fit onto a single CLPS lander as a lunar rover 54 as shown in FIG. 2, and validate that the resource intake system 104 and beneficiation systems 124 are architecturally consistent. The lunar rover 54 recharges or swaps out its batteries or fuel cells and may return to mining in the permanently shadowed region. There are locations in the Moon's poles where driving distances from sunlight to the ice resource are a few kilometers on gentle slopes. Ice concentrations in these "Type 2" locations are expected to have a shallow dry overburden of about 30-50 cm that should be removed.

Variations on this system 100 may be added to extend its reach into the deeper permanently shadowed regions where ice has higher concentrations and less overburden. For example, additional fuel cells may increase driving distance of the lunar rover 54, or with solar energy towers, the mining and processing could be done entirely inside a permanently shadowed region with no driving back to sunlight. Using beneficiation 124 instead of thermal extraction reduces the energy, the infrastructure, and the cost, making it commercially viable and supporting sustainable exploration. It is possible as noted above that 800 kW of thermal energy may be needed to extract 2,450 tons of water yearly to support the future commercial demand for lunar water. Producing 2,450 tons of water yearly at 5% concentration requires processing 49,000 tons of lunar regolith yearly or 1.55 kg/s. It is considered that sunlight has a duty cycle of 70% in a polar location, and to obtain 2% yield, it may be processed at 5.55 kg/s to make up the difference. A large-scale beneficiation system 124 may process 3 kg/s, which is about ten times a pilot plant goal. With a mining/hauling duty cycle of about 50%, the operation may require four separate systems 100. With each system 100 operating at 5 kW, this is a 97.5% power reduction versus thermal extraction. With subsequent processing taking place in the sunlight, there is potentially a greater than 99% reduction of total energy and infrastructure in the permanently shadowed region.

The system 100 may enable rapid startup of propellant mining to be operational in the earliest years, for example, of the Artemis surface operations. The system 100 may integrate into Artemis' sequence of missions that start with the near-term development of enabling infrastructure. A pilot plant for the system may fly within 7 years on a single commercial lander the size of a Blue Moon lander, thus laying the foundation for a sustained human and robotic presence.

Figure 4:
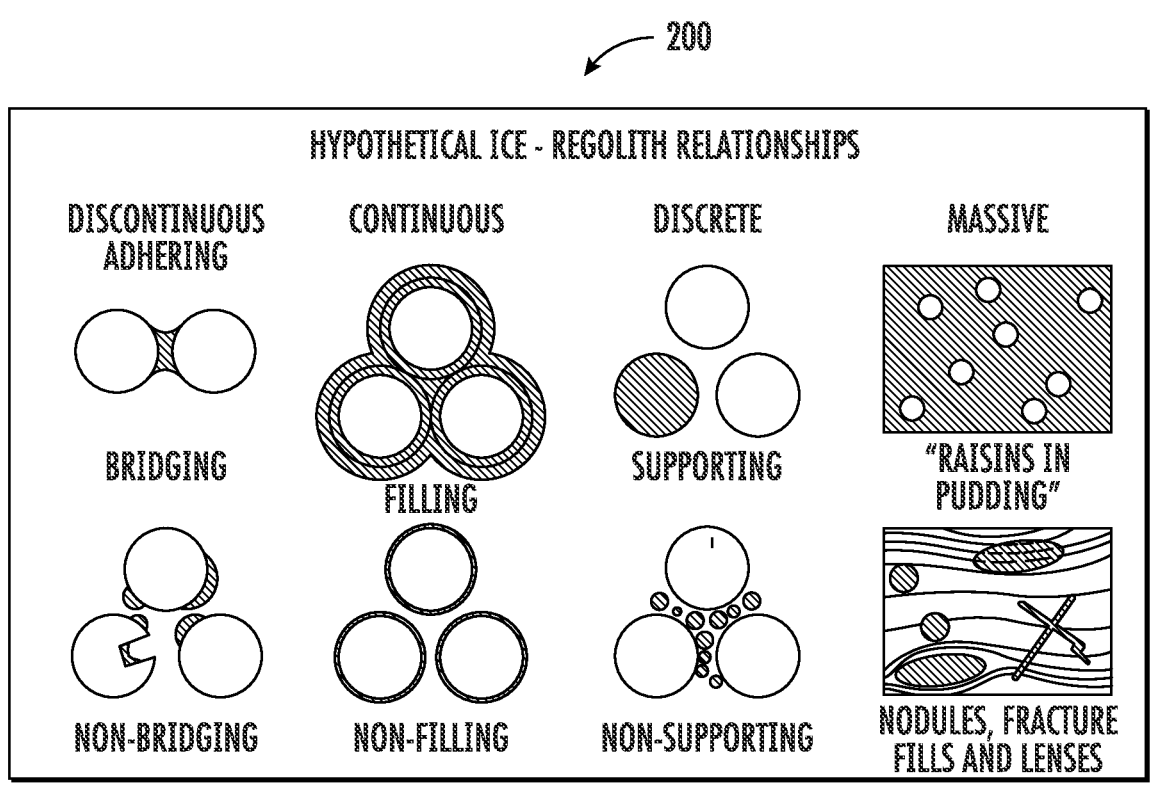
FIG. 4 is a chart of hypothetical ice-regolith relationships.

Referring now to FIG. 4, a table 200 illustrates hypothetical ice-regolith relationships and in an illustration from the Marshall Space Flight Center and produced by Dr. Doug Rickman, and showing several possible relationships between the ice and lithic phases and evaluated with reference to the system 100 of FIG. 3. The ice is likely granular and crystalline as also shown by supporting and non-supporting cases in the table of FIG. 4. Reworking with vapor deposition may have created cementation, as shown by the bridging and filling. Tests have been conducted for mining and cone penetrometry in icy lunar regolith with Non-Filling, Filling, and "Raisins . . . " cases. It was found that mining in the latter two cases was slow and those types of deposits may not be a candidate for an excavation-based technology. Most importantly, those types of deposits are unlikely to exist near the surface due to meteoroid gardening. Prospecting may identify better candidate deposits.

The system 100 may incorporate ice-simulant mixtures representing the bridging, non-filling, supporting, and non-supporting cases as shown in the table of FIG. 4. At cryogenic temperatures, filling and "raisins" cases are as hard as granite and not excavatable. The bridging case may work for lower water concentrations, as long as the 'neck' between the two grains is weak. This can be quantified by analyzing the microstructure for correlation to the strength tests. The Non-Bridging case is not sufficiently different than Non-Filling to require additional tests, and the mechanical behavior of "Nodules, Fracture Fills, and Lenses" will be bounded by the other cases.

Liquid nitrogen chilled regolith grains may be sprinkled into liquid water near its freezing point then extracted to create ice-coated grains for several of these cases. Misting water onto regolith as it is filled layer-by-layer with liquid nitrogen chilling and/or freezing slightly wetted regolith may create Bridging. Filling and Raisins cases may be made by mixing regolith with liquid water prior to freezing. It is possible to develop these cases in a regolith box with liquid nitrogen chilling. The simulant used in these mixtures may be based on high-fidelity simulants. for testing purposes.

The geotechnical properties of each case may be fully characterized, including use of existing compression test capabilities during testing. Other geotechnical and field test methods, such as shear vane, penetrometry, and similar techniques, may calibrate each method for the different cases. It is possible to develop Icy Lunar Polar Regolith Simulants that display the same mechanical behaviors as these simulants but without the ice, enabling their use outdoors and without freezers. This can be accomplished with additives such as ground-up plastic, which is commercially available and has a specific gravity close to ice and low-concentration cementing agents.

The system 100 includes the excavation subsystem 104. Excavating technology is relatively mature. It is possible to quantify digging forces for the ice-regolith mixtures, while focusing on the "excavatable" cases. These are likely Bridging, Non Filling, Supporting, and Non-Supporting (FIG. 4). The system may be constructed as a rig that has actuators and load cells to push digging implements using toothed, straight-edged, and other geometries. The digging actuators may mount on a lunar rover with a target performance capability at pilot-plant scale of double the force needed to cut the regolith in each of these excavatable cases, i.e., safety factor of 2, and to excavate and deposit into a hopper at a rate of 30 kg in 100 seconds.

The system 100 may perform rock rejection in terrestrial excavators, for example, accomplished with "grizzlies" to let soil through while keeping rocks out. Rocks may become permanently jammed in the grid over time, impeding soil flow. The system 50 shown in FIG. 2 includes the pivotable bars as a solution. Astronauts alternatively may visit them to pry the rocks out, but the system 100 may robotically unjam rocks by increasing spacing of the grid to liberate rocks, then decreasing the spacing for the next digging cycle such as with a moveable or pivotable bar assembly. There are several mechanisms that may be incorporated. For example, the system 100 may mount half the bars on an axle to swing away or by other pivot joint as explained relative to FIG. 2, which may increase effectiveness, simplicity, reliability, and ability to boot the mechanical joints to prevent dust intrusion. The target performance goal is for 0%+/−0% of rocks to jam after 1 ton of rocks has been rejected.

The system 100 incorporates gravel separation to prevent smaller rocks from proceeding into the beneficiation system 124. By monitoring the grizzly small enough to reject gravel, this may be unnecessary, but in lunar gravity, the soil may not pass through the smaller gaps due to cohesion. Some testing of gravity flights have shown non-flow of lunar fines through cylindrical openings as wide as 5 cm. The gravel separation section of the system 100 may use a mechanical "wiper" or agitation or auger to move soil through the openings while pushing gravel to a rejection port. This is often done in terrestrial industry with an auger, but augers are subject to jamming. Augers may jam with regolith. The system 100 may include a jam-proof gravel separator by having a low-gear mode with sufficient mechanical strength to crush jammed gravel and a release hatch as backup to dump an entire jammed load. A performance goal is 0+/−0 jams after 1 ton of gravel has been separated.

For beneficiation to extract ice from the Bridging, Non-Bridging, and Non-Filling case as shown in the examples of FIG. 4, a light grinding stage may liberate ice fragments from the lithic fragments. Fracture may generally occur along dissimilar material boundaries, so grinding may be effective, and this is a reason why it is commonly used in terrestrial mining. A challenge is grinding generates heat. At permanently shadowed regions, the temperatures in vacuum pose no risk of the particles becoming wet and sticky from melted ice. However, the heat may cause loss of the resource to sublimation. The grinding, rolling and impact hammering may maximize liberation of ice fragments without raising their temperature significantly.

A one micron particle may sublime away in about 12 hours at 200 K, and permanently shadowed region ice deposits are generally below 100 K. An ice-metal interface fractures with 2 J/m$^2$, so reasonably assuming equal energy is partitioned into heating the ice phase during fracture, using the heat capacity of water ice at 100 K, a one micron particle of ice may be raised from 100 K to 103.4 K by breaking it off the lithic particle. It is possible to test on ice-coated particles and examine them in a microscope pre- and post-grinding to quantify effectiveness in liberating the ice phase from lithic phases. The simulant may be pre-chilled to 77 K and it is possible to measure the simulant's temperature post-grinding, with a performance goal of raising temperature no more than 10 K, which results in a safety factor of 10. The target throughput is 0.3 kg/s, which may require parallelization of grinders.

The resource intake system 104 may include digging, rock rejection, gravel separation, and grinding and may be integrated onto a lunar rover 54. The resource intake system 104 may deposit the regolith into a hopper that periodically closes to begin beneficiation. After the regolith has been moved into the beneficiation system 124, the hopper may open so mining can continue while the beneficiation system processes the first batch. An integrated prototype in a soil bin on a lunar rover in a rockyard may produce 30 kg in 100 s with 0+/−0 jams.

It should be understood that beneficiation is routinely used in terrestrial mining as an intermediate step between extraction and chemical processing, and thus, it may be used in the system 100 to concentrate lunar minerals and applied to ice.

As noted above, the system 100 may separate particles per the ratio of inertial force and aerodynamic drag force, which scales as density times particle diameter, ρd. Since $\rho_{Rock} \approx 3 \rho_{ice}$, pneumatic separation may separate lithic (rock) particles of d into the same bin as ice particles of 3d, and thus have 9 times larger inertia. The system 100 may incorporate a pneumatic separator that splits the lithic (non-ice) particles of the lunar soil into three sizes, with splits at certain ranges, such as splits of about 20-40 microns and 600 to 800 microns for lithic fragments in an example, and in a more detailed example, 30 microns and 693 microns for the lithic fragments. This will place the splits for the ice particles at 90 microns and 2.08 millimeters. Other ranges may be used and vary, such as 25-35 microns and 650-750 microns for lithic fragments, and variations of about 5% or 10% from these values.

The system 100 may incorporate three pneumatically-separated material streams such as those illustrated in the system 50 of FIG. 2, and each stream will pass through a magnetic separator 84 (FIG. 2) (132 in FIG. 3) to remove magnetic particles. As noted above, magnetic separation for lunar soil may be challenging because paramagnetic susceptibility of minerals may be dominated by the superparamagnetic response of nanophase iron (NpFe) contained in the glass coating of the finest particles. Therefore, magnets tend to pull just the fine particles out regardless of their composition. However, lunar ice is sufficiently different than regolith particles to enable ice separation from both dust and most of the larger mineral and lithic particles on their magnetic properties. Furthermore, the less than 30 µm fines may have been separated pneumatically, and thus, the magnetic field in that one stream may be reduced as necessary. In highly mature lunar soil, some minerals have lost much of their pristine magnetic character by incorporation into glass agglutinate particles, and may be difficult to beneficiate from ice by magnetism alone. However, the system 100 may incorporate magnetic separation that may reduce the material stream prior to electrostatic separation, thus enabling the next stage to keep up with the flow rate and obtain higher yield.

It is possible to quantify realistic magnetic susceptibilities for lunar soil at a range of temperatures where beneficiation may occur in ground tests and on the lunar surface in a permanently shaded region, allowing the system 100 to refine operating parameters of the magnetic separation 132. According to the Curie-Weiss law, paramagnetic susceptibility is inversely related to temperature minus the Curie Constant, which is about 11 K for olivine. Comparing olivine's susceptibility in a T=40 K permanently shaded region versus at 293K, susceptibility is 6 times stronger in the permanently shaded region, making magnetic separation a more efficient process in that region. It is possible to measure the paramagnetic response of the primary and some trace minerals found in lunar soil from 533 K, which corresponds to lunar equatorial daytime temperatures to 77.36 K, which corresponds to the boiling point of liquid nitrogen, enabling a curve fit to the Curie-Weiss law to extrapolate to temperatures in permanently shaded regions.

It is possible to validate a mixing model by measuring simulants of known fractions of these minerals. Based on temperature dependence, it is possible to calculate the role of npFe relative to mineral paramagnetism in the temperature-dependence, because paramagnetism follows a somewhat different trend than superparamagnetism.

A magnetic separator 132 may be tested such as in a brassboard arrangement and may include a magnetic drum roller for each of the three material streams so that the non-magnetic ice particles with higher inertia fly off sooner than the magnetic lithic and glass particles with less inertia. Non-magnetic lithic and glass particles may be separated next in the electrostatic state such as using the tribocharged electrostatic separation 136.

As noted above, tribocharging is a surface phenomenon, but magnetization is a bulk phenomenon, and for this reason, the magnetic throughput scales better for high processing rate on a small rover. The magnetic separation 132 is preferably used first, discarding up to 80% of the lithic material to slag, and the electrostatic separation 136 is used to achieve more complete separation. Electrostatic beneficiation 136 should be effective at concentrating ilmenite for oxygen production from among the other silicate minerals producing 50-60% concentration of ilmenite in one pass and 90% in two passes. This technique may work by running mixed-mineralogy lunar regolith through a baffle to rub the soil grains across selected materials, causing the various minerals to tribocharge based on their surface chemistry.

Ice is known to tribocharge and the properties of ice and silicate grains are different such that that electrostatic separation may be highly efficient. Comparing tribocharging against aluminum for silicates versus ice of the same particle diameter, the ice will experience from 100 to 10,000 times the acceleration in an electric field as the silicates. The size splits as three separate streams induced by the pneumatic separator 128 may be chosen with respect to these values to ensure 100% separation of ice in the middle size range, which contains about 62% weight of the lunar soil and extensive separation in the other two size ranges. Practical beneficiation may not achieve complete separation, but these calculations indicate significant concentration of ice is possible with an ideal of nearly complete separation. A higher fidelity prototype in future work may pneumatically split the soil into more than three streams and include multiple passes to achieve higher separation.

It is possible to individually tribocharge the main constituent minerals and glass of lunar soil plus water ice crystals, frozen to liquid nitrogen temperature by pouring down baffles of aluminum, Teflon, and similar materials. The grains may fall into an electrometer to measure the resulting charge. The apparatus may be chilled with liquid nitrogen and the test performed in a large freezer. Charge dissipation from granular materials into the atmosphere is very slow, enabling stable measurements without vacuum. A flight system typically will not be in vacuum since it will use pneumatics in a batch processing mode. This may validate a tribocharging design and enable the system to select the material to use in a baffle.

The electrostatic separator 136 may include a baffle of the selected material to tribocharge the particles followed by the particles falling past high voltage plates to alter their trajectories. The electrostatic subsystem 136 may be integrated into the beneficiation system. The system may remove 80% of the remaining lithic and glass particles from the ice in this three-stream system. The system may identify design parameters that obtain 95% separation in a future high fidelity prototype using a larger number of pneumatically separated streams and demonstrate the physics and scaling functions to ensure that result.

The beneficiation system 124 may include the pneumatic 128, magnetic 132, and tribocharger/electrostatic 136 subsystems. Initial testing of the beneficiation system 124 may use ground plastic in lieu of ice, but final testing may use crystalline water ice particles mixed in high fidelity lunar simulant in a large freezer facility. Low gravity testing may be left for future research. A flight system may store a final, beneficiated resource in a hopper that is passively re-chilled by radiators in a cold environment prior to hauling out to the sunlight for further processing.

A lunar rover may generate higher forces for digging and have more exposure to dust. The lunar rovers may travel back and forth across the same paths hundreds of times, which loosens lunar soil and increases the risk of getting stuck. They should operate long-term with minimal maintenance for commercial viability.

Mobility is a key component of water extraction technology to generate forces for digging and hauling. It has been shown via experimentation and the empirical data obtained from experiments that no design feature such as wheel diameter, motor torque, gear ratio, or tread design have any correlation to drivability in lunar regolith. Instead, it takes a combination of seven or more parameters to see any correlation to drivability, and still the correlation is not strong. There is a high Reynolds shear dilatancy of lunar soil produced through a whole-vehicle interaction of ground pressure, vehicle center of mass, and wheel slippage. There is a cascade of events that produces 'slip diagonalization' in which diagonally opposite wheels lose traction. This happens to about 30% of the lunar robots within just 10 minutes and usually faster times. The system 100 may incorporate 'initiating event' sensors and response software on a lunar rover used for mining to avoid getting stuck. The system 100 may incorporate a vision system with machine learning trained for rock detection to steer around obstacles. The system 100 may switch to slow-speed, high-torque driving mode when the system detects that the lunar rover was tilted, such as from one wheel driving over a crater.

This demonstrates an advance in driving performance and reliability by reducing risk of an "event," but it does not de-escalate an event as it occurs. To de-escalate and make a reliable mining platform, an advanced "Refuse-to-Get-Stuck" enhancement may detect unexpected translational and rotational accelerations, quickly detect wheel slip, and use all-wheel independent rotation control with suspension for ground pressure to minimize additional shearing under each wheel while pulling away from a patch of soil where shearing has already occurred. It is possible to measure the slip/dilation/traction relationship in a simulant box for a single wheel, and implement an event detection and wheel control architecture onto a roving platform for testing, thus enabling machine learning for coordinated wheel control.

It is possible to test the system 100 using added rocks and gravel, including a minor fraction of free metal particles which are found in many lunar soils and plastic particles to simulate granular ice. Higher-fidelity simulant may be supplied in a special sandbox with tight anti-weather seals for portions of any testing. This type of test may be a lower fidelity than either an Arctic/Antarctic analog site or an extremely large, climate-controlled, indoor regolith chamber, but it is the correct next step for testing.

Some testing may focus on reliable mobility, traction for excavation, open pit mining strategies, removal of resource-depleted overburden and ramp construction to enter and enter the mining pit, and performance of the resource intake system, including excavation, rock rejection, gravel separation, light grinding, and managing center of mass. For mobility, it is possible to study traction, challenges with skid-steering, where explicit and Ackerman steering are correlated with not getting stuck, and avoidance of getting stuck and initiating events. It is also possible to test with a three second time delay to identify challenges with joystick operation from Earth, which may be a step to guiding more advanced automated control software. Midway through the field tests, the beneficiation system 124 may be delivered and integrated onto a lunar rover. It is possible to demonstrate integration of the resource intake system 104 and beneficiation system 124 plus the beneficiation process on a dynamic platform, which permits accelerating, tilting on slopes, driving across craters, and vibrating. A demonstration of integrated operation with these features will be important to develop further funding for the project, thus enabling it to bring it to commercial viability.

A pilot plant may include water purification, electrolysis, liquefaction, and long-term storage of cryogenic propellants, such as liquid hydrogen and liquid oxygen, and associated functions such as process monitoring/control and energy storage/distribution. It may include an initial study of accommodating an entire pilot plant onto one of the larger consumer lunar payload service. Data for the resource intake system and beneficiator systems, deployment from the lander to the surface, and power requirements may be acquired and design modifications made. Testing may improve estimates of a pilot plant's mass, extraction efficiency and rate, load per mining cycle, energy, and mass of onboard energy systems. This model may be used to perform a parameter sensitivity study for the overall system.

During complete testing, it may be found that the beneficiation system 124 may fail to concentrate the ice adequately. Other combinations and settings may be adjusted and it is possible to implement a multi-stage system. It is possible to consider a stand-alone beneficiating unit in the permanently shaded region with the lunar rover bringing fuel cells or other techniques to transport the modest energy. During testing, it is possible to produce discrete measurements of lunar soil properties and tests. A spreadsheet-based mining operation architectural model may be presented. Discrete measurements may be in a spreadsheet in ASCII, about 100 kB. Data logged measurements may be in delimited ASCII files, up to about 100 MB. Video may be in a standard format from commercial-off-the-shelf cameras, on DVDs, up to about 200 GB for testing results.

Figure 5:
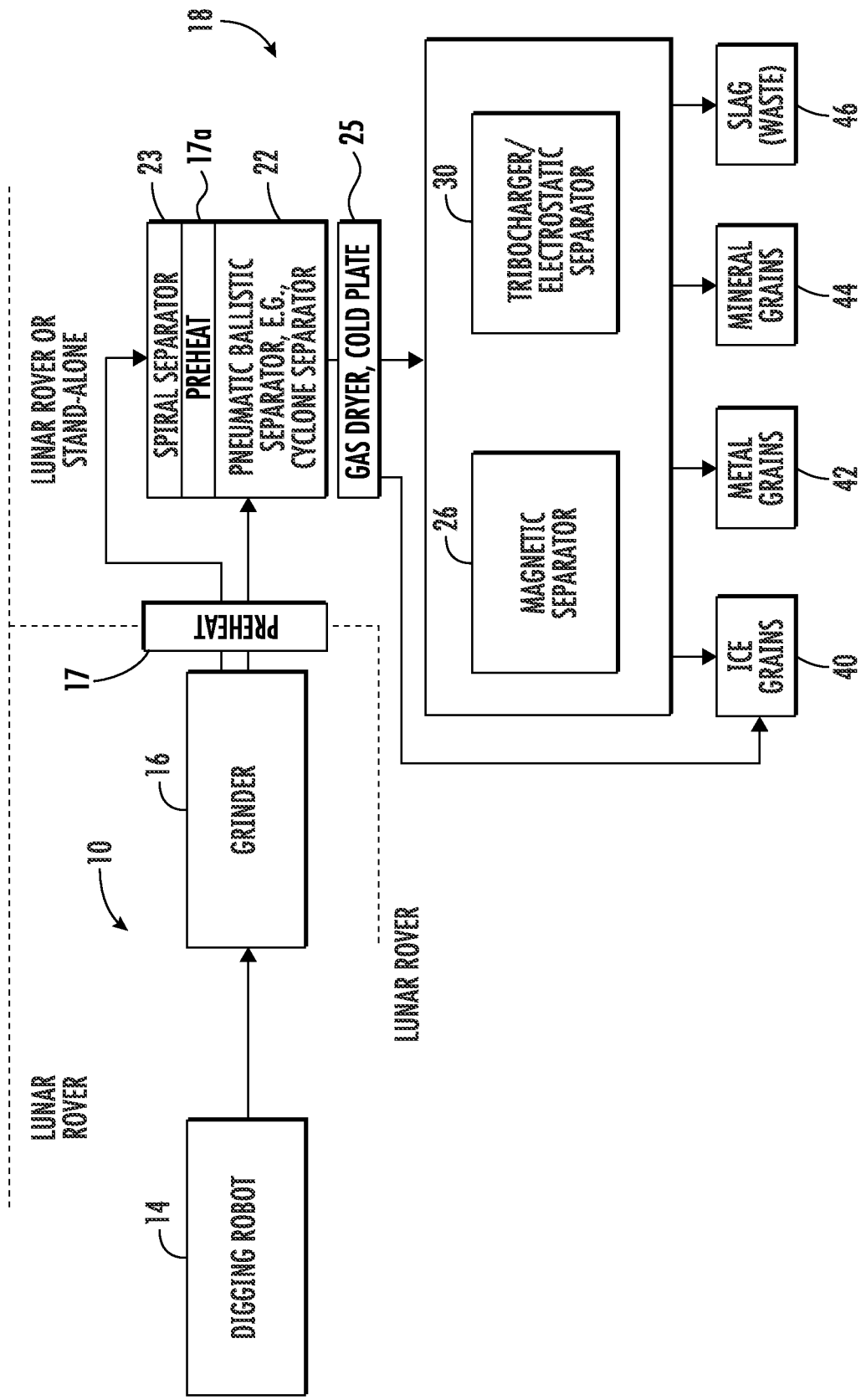
FIG. 5 is another high level block diagram similar to that shown in FIG. 1, but showing the system incorporating a heater.

Referring now to FIG. 5, the system 10 is illustrated as including a heater 17 that operates in this example as a preheater that may be configured to heat the ice-regolith powder and vaporize any layer of ice in at least a continuous, non-filling ice-regolith relationship, such as shown in the hypothetical ice-regolith relationships of FIG. 4. The heater 17 may be positioned before as shown at Block 17 or integrated with the pneumatic separator 22 as illustrated by the preheat block labeled 17a. It may also be configured to heat the ice-regolith powder and vaporize ice in an adhering, bridging, an adhering, non-bridging, or a continuous filling ice-regolith relationship.

Figure 6:
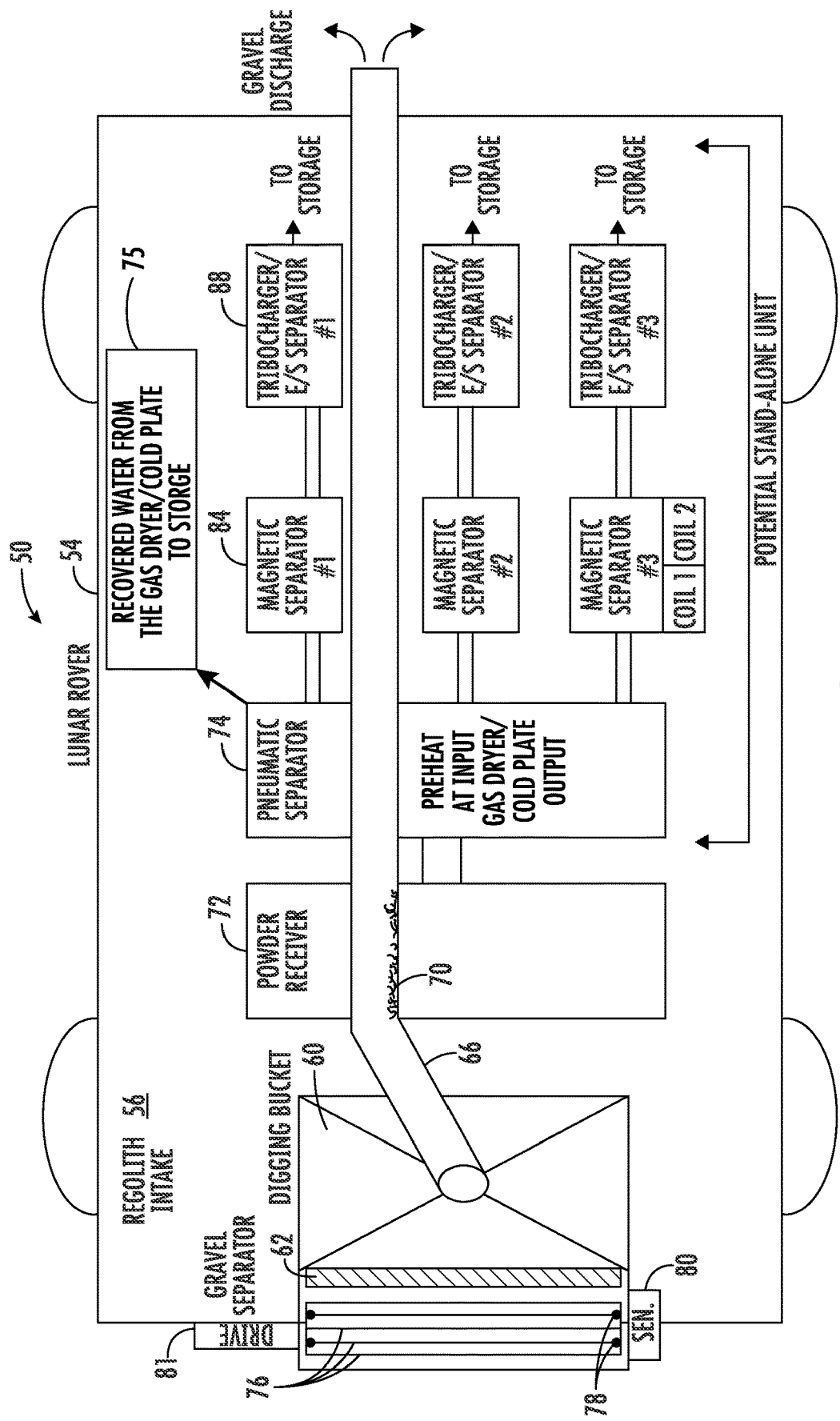
FIG. 6 is another high level block diagram similar to that shown in FIG. 2, but showing the system incorporating a heater.

The heater 17 as a preheater may be positioned to help free up the particles before the spiral separator 23 and pneumatic separator 22. It is also possible for the heater 17a to go after the spiral separator 23, but before the pneumatic separator 22. As also illustrated, a gas dryer or cold plate 25 may be positioned at the output of the pneumatic separator 22 to remove water vapor from the gas. The gas dryer or cold plate 25 may mechanically remove ice from the cold plate or take liquid water from the gas dryer and combine it with the ice grains where it will refreeze. The cold plate 25 may be a chilled surface to freeze out water. Other techniques may be used to take water out of the gas first as a liquid and then refreeze it as ice. FIG. 6 shows the block 75 where water may be recovered from the gas dryer/cold plate to storage.

Figure 7:
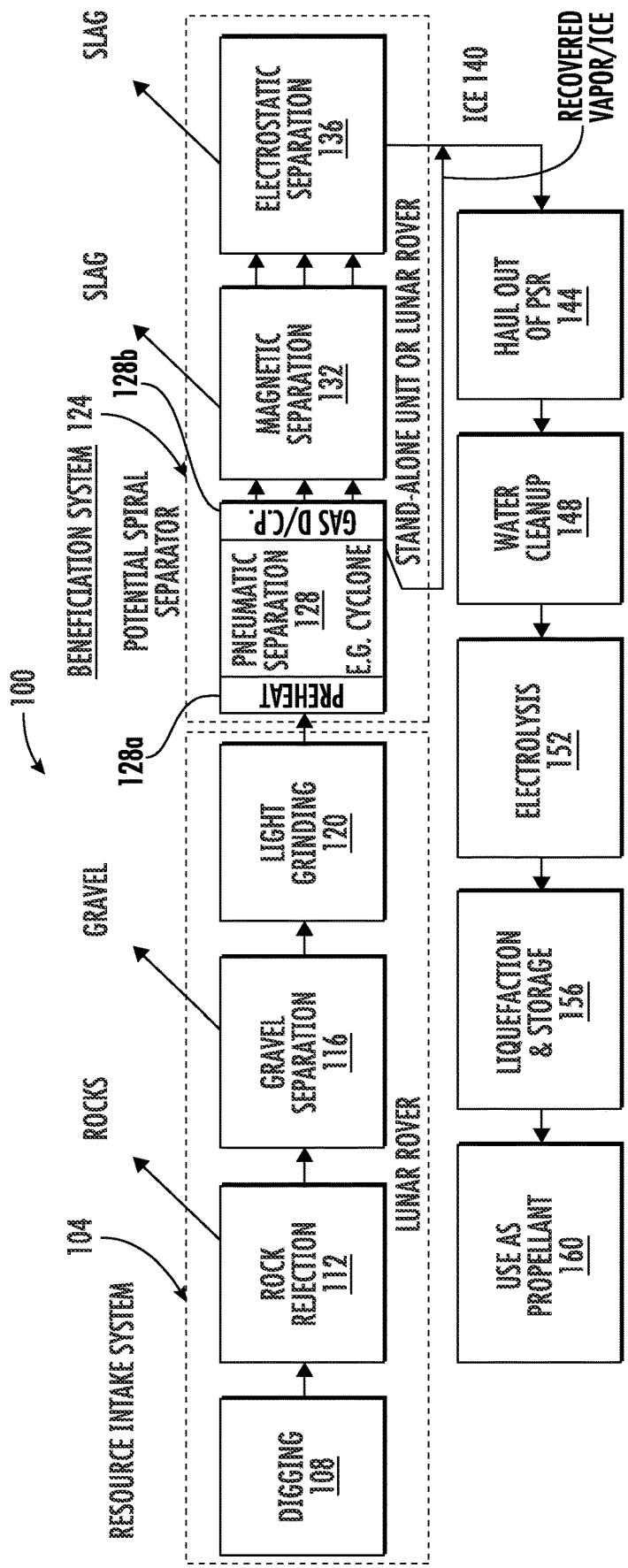
FIG. 7 is another process flow similar to that of FIG. 3, but showing the preheating using the heater.

FIG. 7 illustrates the heater 128a before pneumatic separation 128 and part of the beneficiation system 124 to heat the soil/ice mixture only enough to remove a thin coating from the grains, not so much that it melts all the ice. The removed water vapor from the gas can be liquid or ice formed after recovery and can be combined with the ice 140 as a recovered resource (FIG. 7) via the gas dryer/cold plate 128b.

There are geological arguments that the ice is "discrete," whether supporting or filling or some of both. It is plausible that over geological timescales, some of the ice has migrated slowly creating the "continuous, non-filling" form, as well. This may be a thin coating of ice on all the grains of the ice-regolith powder. The presence of this coating of ice will not disturb magnetic or pneumatic beneficiation, but it may undermine electrostatic beneficiation. This technical problem is solved because the ice layer is so thin, it can be removed by the incorporation of the heating stage early in the process, such as placing the heater 17 after gravel and rock separation and the grinder 16 but before other steps in the process. For example, as illustrated in FIG. 5, the heater 17 may be placed after the grinder 16 as part of the lunar rover or as the stand-alone unit. The heater 17 could be placed anywhere along the sequence, preferably after grinding, as long as it happens before any electrostatic beneficiation process.

The heater 17 may be a heat lamp or a resistive heater using fixed or variable resistance heaters or Positive Temperature Coefficient (PTC) heaters. Microwave heating may not be as efficient since it will also heat the bulk of the soil, not just the surface where the ice is located. However, it is still possible to use microwave heater techniques. Because there is a pneumatic transport and beneficiation in the system 10, another option is to warm the gas that is used in that process as shown by the optional heater 17a as located before the pneumatic ballistic separator 22, e.g., a cyclone separator in an example, but after the spiral separator 23. The gas will be warmed in that process, and that warm gas may cause the ice to evaporate, adding humidity to the gas.

After removing this thin layer of ice, the vaporized water may be recovered as part of the extracted resource. There may be a substantial quantity worth recovering. It is possible if it is significant, it may be captured inside the process by using the cold plate 25 to refreeze it. It is also possible to use a gas dryer to remove the added humidity from the working gas in the pneumatic system as part of the pneumatic ballistic separator 22 and in the example at its output.

Another benefit in this preheating stage is that if any of the ice is "adhering, bridging," "adhering, non-bridging," or "continuous filling," as shown in FIG. 4, then the grinder 16 (FIG. 5) may separate some of that ice from the mineral grains, but the heating imparted by the heater 17 will remove those parts the grinding failed to liberate. Another advantage of grinding before applying the heat from the heater 17 is that the grinding may separate the larger chunks of ice from the minerals using a low-energy, efficient approach. The subsequent heating may be more energy efficient since the heater 17 may be required to vaporize only the smaller pieces that have higher surface area to mass ratios. Heating will vaporize the smaller bits and coatings and capture them, and this may help liberate the mineral grains from each other so that they will flow more smoothly through the beneficiation process, such as the pneumatic ballistic separator 22, the magnetic separator 26, and the tribocharger/electrostatic separator 30. There may be other embodiments and different types of heaters and preheaters may be employed.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that the modifications and embodiments are intended to be included within the scope of the dependent claims.

The invention claimed is:

1. A system for extracting water from lunar regolith, comprising:
   a regolith intake configured to collect lunar regolith and separate and discharge gravel and pass a mixture of ice-regolith powder;
   a heater configured to heat the ice-regolith powder and vaporize any layer of ice in at least a continuous, non-filling ice-regolith relationship; and
   a pneumatic separator configured to receive the ice-regolith powder and pneumatically split the ice-regolith powder into split streams of different sized lithic fragments and ice particles per the ratio of inertial force and aerodynamic drag force of the lithic fragments and ice particles.

2. The system of claim 1, wherein the heater is positioned before or integrated with the pneumatic separator.

3. The system of claim 1, wherein the heater is configured to heat the ice-regolith powder and vaporize ice in an adhering, bridging, an adhering, non-bridging or a continuous filling ice-regolith relationship.

4. The system of claim 1, wherein said regolith intake includes a gravel separator and conveyor, said conveyor having orifices that pass a mixture of ice-regolith powder having ice grains that are 10-100 microns.

5. The system of claim 1, wherein the pneumatic separator includes an output having a gas dryer or cold plate configured to remove water vapor.

6. The system of claim 1, wherein the split streams of different sized lithic fragments and ice particles are based upon splits of 20-40 microns and 600-800 microns for lithic fragments.

7. The system of claim 1, wherein the pneumatic separator splits the ice-regolith power into split streams of lower, mid and upper diameter sized lithic fragments and ice particles.

8. The system of claim 1, wherein each split stream includes at least one of a magnetic separator and tribocharger/electrostatic separator.

9. The system of claim 8, wherein each split stream includes a magnetic separator and tribocharger/electrostatic separator connected thereto.

10. The system of claim 8, wherein each tribocharger/electrostatic separator is configured to produce 100 to 10,000 times the acceleration of ice particles versus lithic fragments of the same diameter size.

11. A system for extracting water from regolith, comprising:
 a regolith intake configured to collect regolith and separate and discharge gravel and pass a mixture of ice-regolith powder;
 a heater configured to heat the ice-regolith powder and vaporize any layer of ice in at least a continuous, non-filling ice-regolith relationship;
 a pneumatic separator configured to receive the ice-regolith powder and pneumatically split the ice-regolith powder into split streams of different sized lithic fragments and ice particles per the ratio of inertial force and aerodynamic drag force of the lithic fragments and ice particles; and
 each of the split streams having a tribocharger/electrostatic separator configured to multiply the acceleration of ice particles versus lithic fragments to aid in ice particles separation.

12. The system of claim 11, wherein the heater is positioned before or integrated with the pneumatic separator.

13. The system of claim 11, wherein the heater is configured to heat the ice-regolith powder and vaporize ice in an adhering, bridging, an adhering, non-bridging or a continuous filling ice-regolith relationship.

14. The system of claim 11, wherein said regolith intake includes a gravel separator and conveyor, said conveyor having orifices that pass a mixture of ice-regolith powder having ice grains that are 10-100 microns.

15. The system of claim 11, wherein the pneumatic separator includes an output having a gas dryer or cold plate configured to remove water vapor.

16. The system of claim 11, wherein the split streams of different sized lithic fragments and ice particles are based upon splits of 20-40 microns and 600-800 microns for lithic fragments.

17. The system of claim 11, wherein the pneumatic separator splits the ice-regolith power into split streams of lower, mid and upper diameter sized lithic fragments and ice particles.

18. The system of claim 11, wherein each tribocharger/electrostatic separator is configured to produce 100 to 10,000 times the acceleration of ice particles versus lithic fragments of the same diameter size.

19. The system of claim 11, wherein each tribocharger/electrostatic separator comprises one or more of a tribocyclone device, a fluidized bed device, a static charger device, a rotating tube device and a propeller device.

20. The system of claim 11, wherein each split stream includes at least one magnetic separator connected between the pneumatic separator and each tribocharger/electrostatic separator.

* * * * *